United States Patent
Miduturi et al.

(10) Patent No.: US 9,850,823 B2
(45) Date of Patent: Dec. 26, 2017

(54) CONTROL SYSTEM AND METHOD FOR CONTROLLING A GAS TURBINE ENGINE DURING TRANSIENTS

(71) Applicants: Krishna C. Miduturi, Orlando, FL (US); Danny W. Kozachuk, Oviedo, FL (US)

(72) Inventors: Krishna C. Miduturi, Orlando, FL (US); Danny W. Kozachuk, Oviedo, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 701 days.

(21) Appl. No.: 14/140,606

(22) Filed: Dec. 26, 2013

(65) Prior Publication Data
US 2015/0184611 A1 Jul. 2, 2015

(51) Int. Cl.
*F02C 9/54* (2006.01)
*F02D 41/30* (2006.01)
*F02C 9/28* (2006.01)

(52) U.S. Cl.
CPC ............. *F02C 9/54* (2013.01); *F02C 9/28* (2013.01); *F02D 41/30* (2013.01); *F05D 2270/04* (2013.01); *F05D 2270/303* (2013.01); *Y02T 10/42* (2013.01)

(58) Field of Classification Search
CPC ...... F02C 9/28; F02C 9/20; F02C 9/26; F02C 9/22; F02C 9/54; F05D 2270/303; F02D 41/30; Y02T 10/42
USPC ........................................................ 700/289
See application file for complete search history.

(56) References Cited

U.S. PATENT DOCUMENTS

| | | | | |
|---|---|---|---|---|
| 3,173,242 A | * | 3/1965 | Erickson | F02B 37/16 60/39.281 |
| 3,673,796 A | * | 7/1972 | Weick | F02D 9/00 123/564 |
| 3,774,395 A | * | 11/1973 | Greune | F02C 7/36 60/39.25 |
| 3,956,883 A | * | 5/1976 | Anderson | F01D 19/00 290/40 R |

(Continued)

FOREIGN PATENT DOCUMENTS

| | | | |
|---|---|---|---|
| CN | 101779021 A | 7/2010 | |
| WO | WO 2014189439 A1 * | 11/2014 | ............ B60W 10/06 |

OTHER PUBLICATIONS

NEPLAN AG, NEPLAN V555. Turbine-Governor Models, Standard Dynamic Turbine-Governor Systems in NEPLAN Power System Analysis Tool [online]. Switzerland. Retrieved from the Internet:< URL: http://www.neplan.ch/wp-content/uploads/2015/08/Nep_TURBINES_GOV.pdf>.*

*Primary Examiner* — Sean Shechtman
*Assistant Examiner* — Mohammed Shafayet

(57) ABSTRACT

A control system and method for a gas turbine engine are provided A controller (40) is responsive to at least one parameter to control an air-to-fuel ratio. The parameter may be a measured engine exhaust temperature from a temperature sensor (42). During a transient, such as a ramping condition of the engine, a measured value of such parameter may have a time lag affecting one or more control settings during the transient condition. The controller is programmed to predictively determine a bias for the measured value of the parameter to correct such control settings and avoid combustion instabilities and high emissions during such transient conditions.

15 Claims, 2 Drawing Sheets

(56) References Cited

U.S. PATENT DOCUMENTS

| | | | | | |
|---|---|---|---|---|---|
| 3,979,904 | A * | 9/1976 | Hobbs | | F02C 9/40 290/40 R |
| 4,055,997 | A * | 11/1977 | Kniat | | F02C 9/28 374/101 |
| 4,242,592 | A * | 12/1980 | Yannone | | F02C 9/56 290/40 R |
| 4,259,835 | A * | 4/1981 | Reed | | F02C 9/28 60/39.281 |
| 4,292,806 | A * | 10/1981 | Moore | | F02B 37/00 123/41.11 |
| 4,550,565 | A * | 11/1985 | Ozono | | F01K 23/101 60/39.182 |
| 4,700,542 | A * | 10/1987 | Wang | | F02B 41/10 60/39.163 |
| 5,095,221 | A * | 3/1992 | Tyler | | F02C 9/28 290/1 R |
| 5,103,629 | A * | 4/1992 | Mumford | | F02C 9/28 60/778 |
| 5,252,860 | A * | 10/1993 | McCarty | | F02C 9/28 290/40 R |
| 5,487,265 | A * | 1/1996 | Rajamani | | F02C 9/28 60/39.27 |
| 5,636,507 | A * | 6/1997 | Rajamani | | F02C 9/28 60/39.27 |
| 5,896,736 | A * | 4/1999 | Rajamani | | F02C 9/20 60/773 |
| 6,050,086 | A * | 4/2000 | Ishizuka | | F01N 3/2013 60/274 |
| 6,379,038 | B1 * | 4/2002 | Felice | | G01J 5/0003 374/126 |
| 6,718,960 | B2 * | 4/2004 | Someno | | F02D 37/02 123/478 |
| 6,915,776 | B2 * | 7/2005 | zur Loye | | F02B 1/12 123/304 |
| 7,269,953 | B2 * | 9/2007 | Gadde | | F01D 17/162 60/39.27 |
| 7,422,414 | B2 * | 9/2008 | Fujii | | F02C 9/20 415/1 |
| 7,643,928 | B2 * | 1/2010 | Soucy | | F02C 9/56 105/35 |
| 7,915,868 | B1 * | 3/2011 | Maters | | F01D 25/00 322/10 |
| 8,171,717 | B2 * | 5/2012 | Mosley | | F02C 9/50 60/240 |
| 8,205,606 | B2 * | 6/2012 | Rodriguez | | F01N 11/005 123/568.21 |
| 8,215,095 | B2 * | 7/2012 | Mosley | | F02C 9/28 60/240 |
| 8,429,904 | B2 * | 4/2013 | Shibamori | | F01N 3/023 60/295 |
| 8,447,500 | B2 * | 5/2013 | Suzuki | | F01N 11/005 123/568.12 |
| 8,555,653 | B2 * | 10/2013 | Snider | | F01D 19/00 60/773 |
| 2002/0124828 | A1 * | 9/2002 | Shirakawa | | F02D 41/005 123/299 |
| 2003/0131593 | A1 * | 7/2003 | Asanuma | | F01N 13/009 60/297 |
| 2003/0217553 | A1 * | 11/2003 | Gadde | | F02C 9/28 60/775 |
| 2004/0000144 | A1 * | 1/2004 | Rajamani | | F02C 9/28 60/772 |
| 2004/0006986 | A1 * | 1/2004 | Baeuerle | | F01L 1/34 60/601 |
| 2006/0042258 | A1 * | 3/2006 | Gadde | | F01D 17/162 60/772 |
| 2007/0074516 | A1 * | 4/2007 | Peck | | F02C 9/18 60/772 |
| 2007/0101724 | A1 * | 5/2007 | Gadde | | F02C 9/263 60/773 |
| 2008/0027626 | A1 * | 1/2008 | Inoue | | F02D 41/0235 701/108 |
| 2009/0193788 | A1 * | 8/2009 | Szepek | | H04B 17/345 60/39.281 |
| 2011/0146291 | A1 * | 6/2011 | Snider | | F01D 19/00 60/778 |
| 2012/0017600 | A1 * | 1/2012 | Saito | | F02C 9/263 60/773 |
| 2012/0096835 | A1 * | 4/2012 | Gates | | F23J 15/003 60/274 |
| 2012/0109572 | A1 * | 5/2012 | Shimizu | | G01K 1/165 702/131 |
| 2013/0125557 | A1 * | 5/2013 | Scipio | | F02C 9/22 60/773 |
| 2013/0173074 | A1 * | 7/2013 | Chandler | | F02C 9/40 700/287 |
| 2014/0123624 | A1 * | 5/2014 | Minto | | F23N 5/18 60/39.281 |
| 2014/0257542 | A1 * | 9/2014 | Li | | G05B 19/404 700/97 |

* cited by examiner

CONTROL SYSTEM AND METHOD FOR CONTROLLING A GAS TURBINE ENGINE DURING TRANSIENTS

FIELD OF THE INVENTION

This invention relates in general to control systems and methods for power generation, such as gas turbine engines, and, more particularly, to a control system and method for controlling a gas turbine engine during transients, such as ramping.

BACKGROUND OF THE INVENTION

Power generation systems, such as gas turbine power plants, include sophisticated combustion components and processes for improving combustion efficiency. Recent market trends demand a fast ramping capability for gas turbine engines. For example, with the advent of power generation through utilization of wind energy, power utilities may interconnect gas turbines with wind turbine fields to maintain constant grid power generation regardless of wind variability. Thus, having a fast ramping capability is becoming a desirable capability so that gas turbine engines can be helpful to maintain utility power generation at a constant level and to mitigate for any other grid disturbances. Notwithstanding of advances which have been made in this technical field, there continues to be a need for a control system and methodology that during these fast ramping conditions can maintain appropriate engine combustion dynamics and in turn provide acceptable levels of emissions

BRIEF DESCRIPTION OF THE DRAWINGS

The invention is explained in the following description in view of the drawings that show.

DETAILED DESCRIPTION OF THE INVENTION

The present inventors have innovatively overcome certain issues that can arise in connection with operation of gas turbine engines during transient conditions, such as may involve relatively fast-ramping conditions, which in one non-limiting example may comprise up to 40 MW/min and potentially even higher ramping rates. The present inventors have cleverly recognized that a lag in a measured engine exhaust temperature can lead to fluctuations in the air-to-fuel ratio (AFR) of the engine, which in turn can result in high emissions of nitrogen oxides (NOx) and high combustion instabilities during such transients. The present inventors propose an innovative control system and method, which in one example embodiment removes or at least substantially reduces the effects of a lag in a measured engine exhaust temperature.

Figure 1:
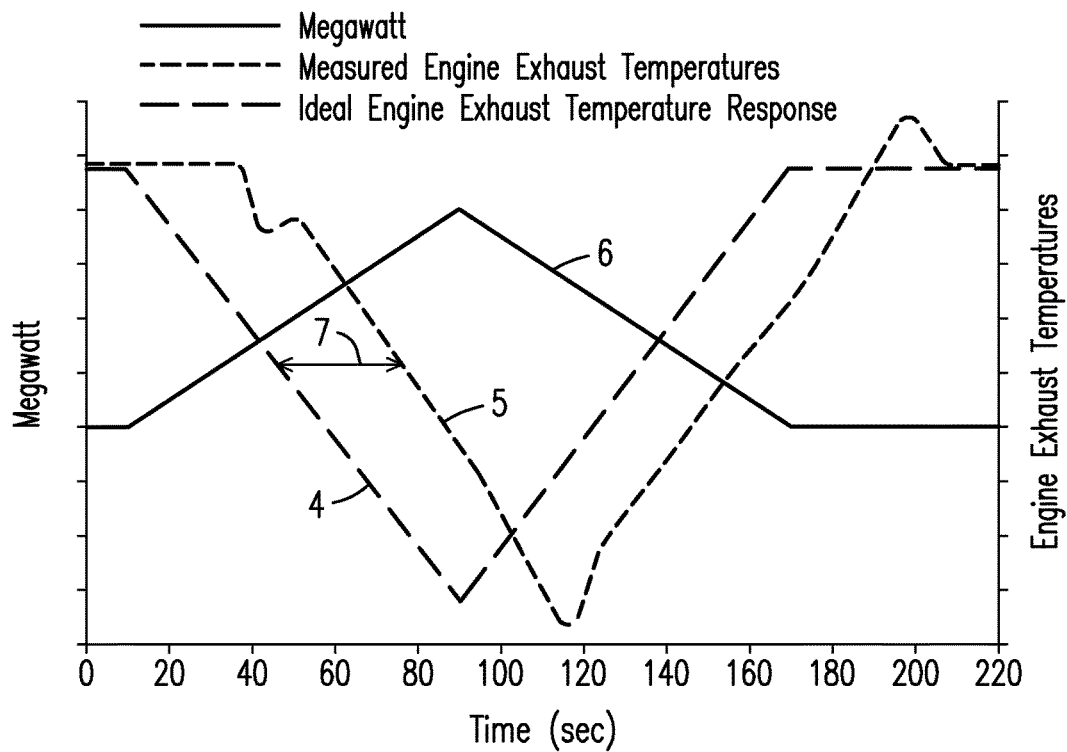
FIG. 1 shows respective example plots that may be used for comparatively conceptualizing an idealized engine exhaust temperature response relative to a measured engine exhaust temperature response during a transient condition of the engine.
Figure 2:
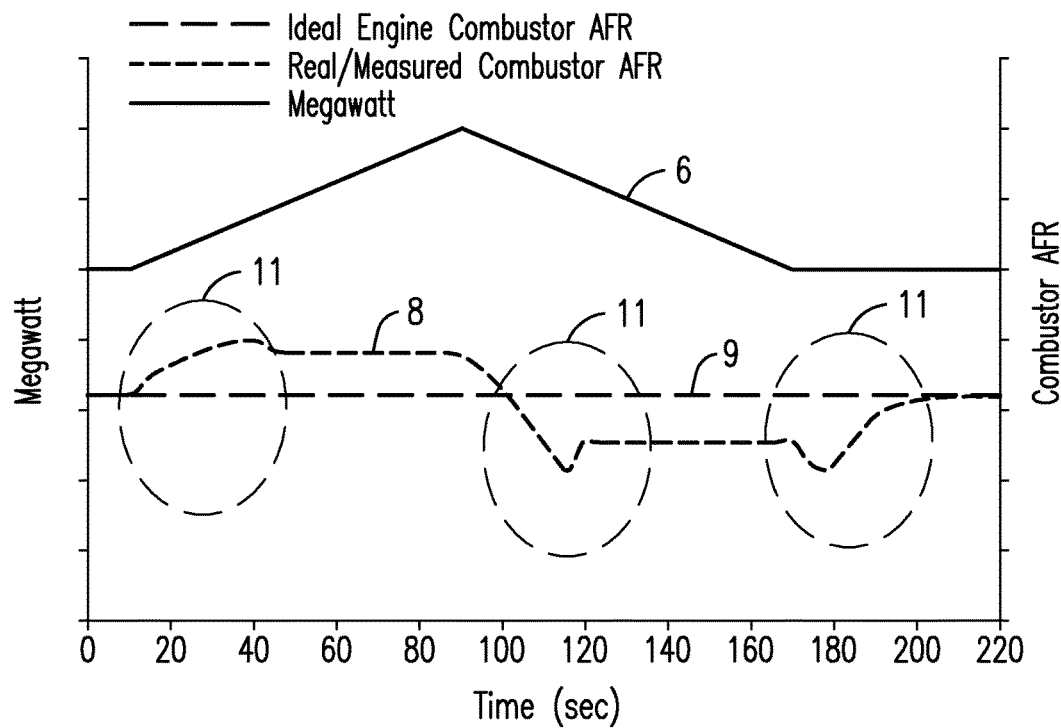
FIG. 2 shows respective example plots that may be used for comparatively conceptualizing an actual combustor air-to-fuel ratio (AFR) relative to an idealized combustor AFR during the transient condition of the engine

FIG. 1 shows respective example plots that may be used for comparing an idealized engine exhaust temperature response (plot 4) relative to a measured engine exhaust temperature response (5) during a transient, such as a ramping condition of the engine, represented by plot 6 In this example, one can appreciate a time lag (represented by arrow 7) of approximately 30 seconds between the idealized engine exhaust temperature response and the measured engine exhaust temperature As a result of such a time lag in the measured engine exhaust temperature, the engine air-to-fuel ratio (AFR) may fluctuate during the ramping condition of the engine. This may be appreciated in FIG. 2, where plot 8 represents an example of an actual measured combustor AFR and plot 9 represents an idealized combustor AFR. The circles 11 on plot 8 represent regions prone to relatively high-emissions and high-combustion instabilities. Once the engine reaches steady state operation, the measured exhaust temperatures and AFR substantially match the idealized exhaust temperatures and AFR and, as a result, emissions and combustion dynamics requirements may be met.

Figure 3:
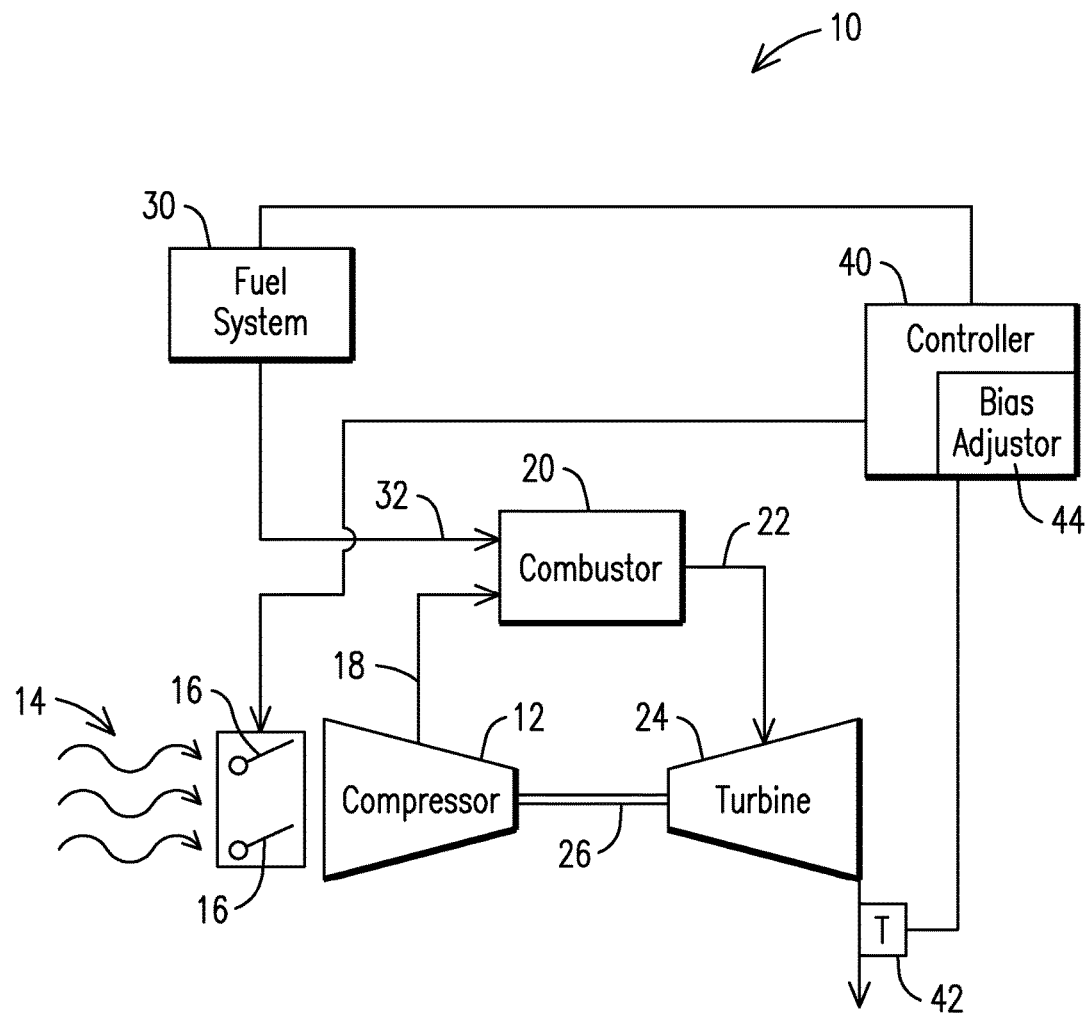
FIG. 3 is a schematic illustration of an example gas turbine system that may benefit from a control system embodying aspects of the invention.

FIG. 3 illustrates a schematic of an exemplary gas turbine system 10, certain components of which may be referred to herein as an engine, and which may benefit from aspects of the invention. It will be recognized that embodiments of the invention may be used with various gas turbine or other power generation systems. System 10 may include a compressor 12 for inletting ambient air flow 14, which may be regulated by inlet guide vanes (IGV) 16 to control air flow to compressor 12 and in turn to a combustor 20 Compressed air 18 may be provided to combustor 20, and combustion gas 22 may be provided to a turbine 24 where energy is extracted to turn a shaft 26 Shaft 26 may power the compressor 12 and auxiliary equipment, such as an electrical generator (not shown)

System 10 may include a fuel system 30, which in one example embodiment may provide at least one controllable flow of combustible fuel 32 to combustor 20. A controller 40 may be provided in the form of a processor or computer with executable instructions, a digital or analog control system, or other device for receiving input signals or data packets, processing data, executing instructions, producing appropriate output signals and transmitting data packets. Controller 40 may be configured with appropriate control modules and databases to execute various aspects of the invention. In one example embodiment, controller 40 may be responsive to at least one parameter to control an air-to-fuel ratio. During a transient such as a ramping condition of the engine, a measured value of such parameter comprises a time lag affecting at least one control setting during the transient condition of the engine. In accordance with aspects of the present invention, controller 40 may be programmed to predictively determine a correction, such as an engine exhaust temperature (Texh) bias, to correct such control settings.

In one example embodiment, controller 40 provides engine control that in part may be based on engine Texh measurements. Without limiting aspects of the present invention, controller 40 may be referred to as an outlet temperature control (OTC) controller and such parameter may comprise a measured engine exhaust temperature, as may be measured by a temperature sensor 42, such as a thermocouple. It will be appreciated that in general any temperature measurement or indication that may be provided to controller 40 which exhibits a time lag and which may be used to control the air-to-fuel ratio could benefit from aspects of the present invention regardless of the location where such measurement or indication may be acquired. Thus, the term engine exhaust temperature measurement need not be limited to an engine exhaust location. For example, such measurement may comprise a blade path temperature measurement, or similar measurements. In one example embodiment, a determination of the bias may be based at least in part on a ramp rate of the engine during the transient condition of the engine and the time lag of the measured engine exhaust temperature. In one example embodiment, the bias may be applied to a steady-state engine Texh value at a present engine condition.

In one example embodiment, a determination of the bias is based on the following equation:

$$Texh_{bias,1} = a \times (MW_{rate} \times \Delta t_{lag} \times (Texh_{SS,1} - Texh_{SS,2})) + b$$

where, $Texh_{bias,1}$=bias to a steady-state exhaust temperature (Texh) value at a present engine condition, $Texh_{SS,1}$=the steady-state Texh value at the present engine condition, $Texh_{SS,2}$=a steady-state Texh value at a target engine condition, $MW_{rate}$=ramp rate of the engine, $\Delta t_{lag}$=value of the lag time, a=a proportionality factor, and b=a site-specific constant.

As can be appreciated from the foregoing equation, the engine exhaust temperature bias is proportional to the ramp rate of the engine, the lag time value, and a differential of engine exhaust temperature values at the present engine condition and the target engine condition. For example, if the lag was left uncorrected, the controller may not appropriately determine that the engine has in fact reached a target condition and the controller may attempt for the IGV and/or fuel flow settings to compensate for this erroneous determination till the lag value of the measured engine exhaust temperature eventually catches up. This bias essentially defines a new pseudo engine state for the ramping condition by predicting a condition where the engine neither overfires nor underfires from the steady state values and hence avoids combustion instabilities and high emissions. Once Texh bias values have been determined, appropriate control logic tables may be developed as shown in Table 1 below. In one example embodiment, such control logic tables essentially function as a bias adjustor 44 configured to adjust the bias determined by controller 40 as a function of ambient temperature and/or engine load.

TABLE 1

Bias Adjustor

| Tambient | Texh, bias | % Load | Multiplier for Texh, bias |
|---|---|---|---|
| 0 | x | 10 | x |
| 10 | x | 20 | x |
| 20 | x | 30 | x |
| 50 | x | 100 | x |

One example control setting that may be corrected based on the determined bias may be a control setting to position inlet guide vanes 16 during the transient condition of the engine. Another example control setting that may corrected may be controlling a demand for controllable flow of combustible fuel 32 to combustor 20 during the transient condition of the engine.

It will be appreciated that aspects of an example inventive apparatus—as may be used in gas turbine engines during transient conditions for removing or at least substantially reducing the effects of a lag in a measured engine exhaust temperature—and methods disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc.), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. An interface display may be a tablet, flat panel display, PDA, or the like.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A control system for a gas turbine engine comprising:
a controller responsive to at least one parameter to control an air-to-fuel ratio, wherein during a transient condition of the engine, a measured value of said at least one parameter comprises a time lag affecting at least one control setting during the transient condition of the engine, wherein the controller is programmed to predictively determine a bias to correct said at least one control setting;
wherein a determination of the bias is based at least in part on a ramp rate of the engine during the transient condition;
wherein said controller provides control that in part is based on engine exhaust temperature measurements and said at least one parameter comprises a measured engine exhaust temperature;
wherein a determination of the bias is based on the time lag determined by the difference between the idealized engine exhaust temperature response and the measured engine exhaust temperature; and
further comprising inlet guide vanes to control inlet air flow to a compressor, wherein said at least one control setting comprises a control setting to position said inlet guide vanes during the transient condition of the engine.

2. The control system of claim 1, wherein the time lag is based on comparing the measured engine exhaust temperature to an idealized engine exhaust temperature response.

3. The control system of claim 1, wherein the bias is applied to a steady-state exhaust temperature value at a present engine condition.

4. The control system of claim 1, wherein a determination of the bias is based on the following equation:

$$Texh_{bias,1} = a \times (MW_{rate} \times \Delta t_{lag} \times (Texh_{SS,1} - Texh_{SS,2})) + b$$

where, $Texh_{bias,1}$=bias to a steady-state exhaust temperature (Texh) value at a present engine condition, $Texh_{SS,1}$=the steady-state Texh value at the present engine condition, $Texh_{SS,2}$=a steady-state Texh value at a target engine condition, $MW_{rate}$=ramp rate of the engine, $\Delta t_{lag}$=value of the lag time, a =a proportionality factor, and b =a site-specific constant.

5. The control system of claim 1, further comprising a fuel system to control at least one fuel flow to a combustor, wherein said at least one control setting further comprises a demand for said at least one fuel flow.

6. The control system of claim 1, further comprising a bias adjustor configured to adjust the bias as a function of ambient temperature.

7. The control system of claim 1, further comprising a bias adjustor configured to adjust the bias as a function of engine load.

8. The control system of claim 1, further comprising a bias adjustor configured to adjust the bias as a function of ambient temperature and/or engine load.

9. A method for controlling a gas turbine engine, the method comprising:

controlling an air-to-fuel ratio with a controller responsive to at least one parameter;

measuring a value of said at least one parameter, which during a transient condition of the engine comprises a time lag affecting at least one control setting during the transient condition of the engine; and predictively determining a bias to correct said at least one control setting; wherein the determining of the bias is based at least in part on a ramp rate of the engine during the transient condition;

wherein said controlling comprises controlling that in part is based on engine exhaust temperature measurements and said at least one parameter comprises a measured engine exhaust temperature;

wherein the determining of the bias is based on the time lag determined by the difference between the idealized engine exhaust temperature response and the measured engine exhaust temperature; and further comprising controlling inlet air flow to a compressor with inlet guide vanes, wherein said at least one control setting comprises a control setting to position said inlet guide vanes during the transient condition of the engine.

10. The method of claim 9, wherein the time lag is based on comparing the measured engine exhaust temperature to an idealized engine exhaust temperature response.

11. The method of claim 9, further comprising applying the bias to a steady-state exhaust temperature value at a present engine condition.

12. The method of claim 9, wherein the determining of the bias is based on the following equation:

$$Texh_{bias,1} = a \times (MW_{rate} \times \Delta t_{lag} \times (Texh_{SS,1} - Texh_{SS,2})) + b$$

where, $Texh_{bais,1}$=bias to a steady-state exhaust temperature (Texh) value at a present engine condition, $Texh_{SS,1}$=the steady-state Texh value at the present engine condition, $Texh_{SS,2}$=a steady-state Texh value at a target engine condition, $MW_{rate}$=ramp rate of the engine, $\Delta t_{lag}$=value of the lag time, a =a proportionality factor, and b =a site-specific constant.

13. The method of claim 9, further comprising controlling at least one fuel flow to a combustor, wherein said at least one control setting further comprises a demand for said at least one fuel flow.

14. The method of claim 9, adjusting the bias as a function of ambient temperature.

15. The method of claim 9, adjusting the bias as a function of engine load.

\* \* \* \* \*